May 7, 1940.  H. E. HARTIG  2,200,225
AIR CONDITIONING SYSTEM
Filed Sept. 9, 1937
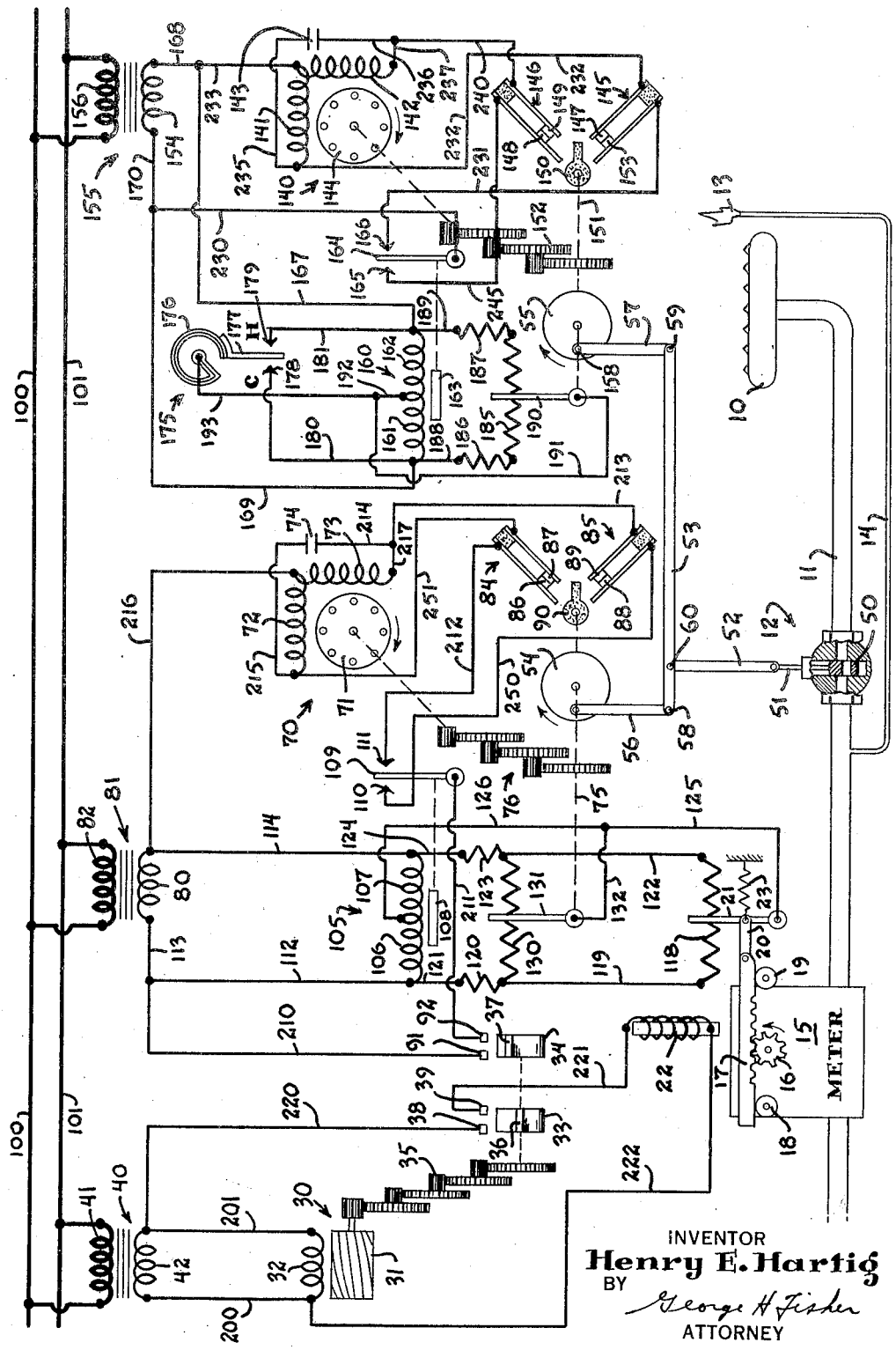
INVENTOR
Henry E. Hartig
BY
*George H Fisher*
ATTORNEY Patented May 7, 1940

2,200,225

UNITED STATES PATENT OFFICE 2,200,225

AIR CONDITIONING SYSTEM

Henry E. Hartig, Robbinsdale, Minn., assignor to Minneapolis-Honeywell Regulator Company, Minneapolis, Minn., a corporation of Delaware Application September 9, 1937, Serial No. 163,051

21 Claims. (Cl. 236—1)

This invention relates to an air conditioning system, and while it is illustrated in connection with a heating system using gas as a fuel, it should be understood that it is equally applicable to heating systems using other kinds of fuel, and to other types of air conditioning systems.

It is common practice in heating systems using a fluid fuel such as gas to control the supply of gas to a heater by means of a room thermostat so that when the temperature of the room is below a desired value, a valve is operated to permit the flow of gas to the heater, and when the temperature of the room has risen to the desired value, the flow of gas is cut off, and remains off until more heat is required in the room as a result of the temperature in the room again falling below the desired value.

This type of control system has certain disadvantages which this invention aims to overcome. When the room thermostat calls for heat, there is a considerable time lag before the effect of the flow of gas to the heater is felt in the room, with the result that the temperature of the room may continue to fall for a time after the room thermostat calls for heat, and because of the fact that the heater is running at full capacity during the time that the room thermostat is calling for heat, there is considerable likelihood that after the room thermostat is satisfied, the temperature of the system may continue to rise for a time because of the heat in the heating system. The result is that instead of maintaining a nearly constant temperature in the room, the temperature may vary between considerable limits, the difference between the maximum and minimum temperature being sufficient to cause discomfort to the occupants of the room.

One reason for the time lag between the time that the room thermostat calls for heat and the time that the temperature of the room begins to rise, or stops falling is that during the time the room thermostat is satisfied, or not calling for heat, the heating plant is completely shut down and the residual heat left in the system is assisting in maintaining the proper temperature. A large portion of this residual heat in the heating system may be used up before the temperature drops below the desired value, and this must be restored before any substantial effect on the temperature of the room by the heating plant is felt.

This difficulty is overcome in my system by supplying continuously the proper amount of fuel to maintain the desired temperature, so that as long as the amount of heat required to maintain the desired temperature is constant by reason of a constant outdoor temperature, etc., the room thermostat will always remain satisfied. If the outdoor temperature begins to drop with the result that the amount of fuel being supplied is insufficient to maintain the proper temperature, the room thermostat calls for more heat and the supply of fuel is increased. Since there has been a constant supply of heat, the supplying of more heat is quickly felt in the room and the time lag between the time that there is a call for heat and the time that the room thermostat is satisfied, is greatly diminished. Since the change in heat supply is relatively small, say from 50% to 60% of the maximum capacity of the heater, instead of from 0 to 100%, the chances of "over-shooting" or the temperature of the room rising after the room thermostat is satisfied are likewise greatly diminished. The result is that a more even temperature is maintained in the room, resulting in greater comfort to the occupants, as well as a saving in fuel.

It is recognized that attempts have been made to provide a modulated control for a heating system wherein there is a continuous flow of fuel to a heater, but, while some of these systems have been able to partially compensate for some variations in the heat demand, none of the systems heretofore, so far as I am aware, have been able to compensate for all the variations in the heat demand and maintain a substantially uniform temperature in the space being heated while supplying a continuous flow of fuel. With my system, I am able to maintain the temperature of the space substantially uniform, by periodically determining how much fuel is required, and then supplying this amount of fuel at a uniform rate.

In order to accomplish these results, I have provided a fuel supply valve with a pair of operating members. At the end of a predetermined heating period, the first operating member adjusts the valve to a position wherein the supply of fuel is at a rate which is equal to the average rate of supply for the predetermined heating period. The other valve operating member, which is under the control of a room thermostat, can adjust the valve a limited amount above or below the position determined by the first operating member according to whether the temperature of the room is too low or too high. At the end of another similar heating period, the valve is again adjusted by the first operator if the average demand for heat has been different from that of the preceding period. Thus, there is always a certain flow of heat during the heating season, which may be increased or decreased according to the amount of heat necessary to keep the temperature of the room uniform, but under ordinary conditions the flow of heat will become substantially uniform as long as the amount of heat required to maintain a uniform temperature does not change materially.

The above advantages of my system would obviously be applicable to a cooling system, for example, as well as to a heating system.

It is therefore an object of my invention to provide an improved air conditioning system wherein the condition of the air is maintained at a substantially constant value.

More specifically, it is an object of my invention to provide a temperature controlling system wherein the temperature of a space is maintained substantially constant by continuously supplying the proper amount of a temperature changing medium.

It is a further object of my invention to provide a thermostatically controlled heating system in which the time lag between the time there is a call for heat and the time the temperature in the space being heated starts to rise, is greatly reduced, and in which the chances of the temperature rising higher than that desired are greatly diminished.

Other objects will become apparent upon a study of the specification, claims, and appended drawing, in which the single figure illustrates a preferred form of my improved system.

Referring to the drawing, a gas burner is indicated by the reference character 10 and a supply pipe 11 is provided for conducting fuel to said burner. Mounted in the supply pipe is a valve indicated generally by the reference character 12 for controlling the amount of fuel passing through said pipe. For insuring the ignition of the fuel issuing from burner 10 a pilot 13 is provide through which fuel constantly flows from the pipe line 11 through a pipe 14. A meter 15 is provided for measuring the amount of fuel passing through the pipe 11, and driven by said meter is a gear 16 which is rotated in the direction of the arrow. Gear 16 is in mesh with a rack 17 which in turn rests on rollers 18 and 19, said rack being connected by means of a link 20 to an arm 21 for a purpose to be later described. Mounted above the rack 17 is an electromagnet 22 which, when energized, causes rack 17 to be moved upwardly and out of engagement with the driving gear 16. A spring 23 causes said rack to be moved toward the right when the rack is moved upwardly under the influence of electromagnet 22.

Magnet 22 is periodically energized by means of a constantly rotating motor 30, said motor including an armature 31 and a field winding 32. Cams 33 and 34 are constantly driven by said motor at a low speed through reduction gearing 35. Each of these cams includes a bridging member 36 and 37, respectively. Cooperating with the bridging member 36 are contacts 38 and 39 which control the circuit through magnet 22. It will therefore be seen that this magnet is energized periodically or when element 36 bridges contacts 38 and 39.

For supplying current to the motor 30, there is a transformer 40 which includes a high tension primary 41 and a low tension secondary 42. Primary 41 being connected to lines 100 and 101 which are in turn connected to a suitable source of power (not shown).

Referring to valve 12 it will be seen that this valve includes a sliding valve member 50 having a port somewhat smaller than the bore through the valve body for a purpose to be later set forth. Valve member 50 includes an upwardly projecting stem 51 connected to a link 52 which is in turn pivotally connected to a lever 53. Lever 53 is actuated by crank members 54 and 55 which are connected to said lever by means of links 56 and 57, respectively, being pivoted thereto at 58 and 59. The location of pivot 60 of link 52 on lever 53 may be considerably nearer pivot 58 than pivot 59 so that if pivot 58 is held stationary, thereby acting as a fulcrum for the lever 53, movement of pivot 59 will cause a relatively small movement of valve member 50 whereas an equal movement of pivot 58, when pivot 59 is acting as the fulcrum, will cause a relatively large movement of valve member 50.

Crank member 54 is rotated by means of a motor generally indicated by the reference character 70, this motor being of the condenser induction type and includes an armature 71, field winding 72, field winding 73 and a condenser 74. Crank member 54 is mounted on a shaft 75 driven at low speed by armature 71 through reduction gearing 76.

The field windings 72 and 73 are connected together at one end and the other ends are connected together through the condenser 74. The junction of windings 72 and 73 is permanently connected to one side of the secondary 80 of a step-down transformer 81, the high tension primary 82 thereof being connected to the lines 100 and 101. To the other ends of windings 72 and 73 are connected switches 84 and 85, respectively, switch 84 including contact members 86 and 87 and switch 85 including contact members 88 and 89. An insulated arm 90 is carried by shaft 75 and is arranged to open switch 84 or 85 upon sufficient rotation of said arm in either direction for a purpose to be later described.

Switches 84 and 85 may be selectively connected to the other side of secondary 80 of transformer 81 so that condenser 74 may be placed in series with either winding 72 or winding 73, depending upon which switch is connected to the source of power. When winding 73 is connected to the source of power through condenser 74 the other winding is directly connected across the secondary 80 and winding 73 leads winding 72 in phase whereupon the motor rotates in the direction of the arrow. If condenser 74 is placed in series with winding 72 then this winding leads winding 73 in phase and the direction of rotation of armature 71 is reversed. Current to the motor 70 passes through contacts 91 and 92 which are closed only when cam 34 is rotated to the position in which member 37 thereon bridges these contacts. It will thus be seen that motor 70 is actuated only periodically.

For controlling the direction of rotation of armature 70 is a relay 105 of the balanced type which includes opposed coils 106 and 107, an armature 108 connected to a switch arm 109, said switch arm cooperating with fixed contacts 110 and 111. Armature 108 moves in the direction of the more highly energized coil, causing a corresponding movement of switch arm 109, and when the coils are equally energized, the armature is in mid position, as illustrated. Relay coils 106 and 107 are connected together at one end thereof, the other end of coil 106 being connected by means of conductors 112 and 113 to one side of the transformer secondary 80 and coil 107 being connected through a conductor 114 to the other side of secondary 80. Also connected to the opposite ends of coils 106 and 107 is a potentiometer resistance 118, one end of resistance 118 being connected through conductor 119, a resistance 120 and conductor 121 to coil 106 and the other end of said resistance 118 being connected by means of conductor 122, a resistance 123 and conductor 124 to the coil 107. Arm 21, previously described, is arranged to move across resistance 118, this arm being connected by means of conductors 125 and 126 to the junction of coils 106 and 107. A second potentiometer resistance 130 is connected in parallel with resistance 118 and the relay coils as clearly illustrated. An arm 131 is arranged to sweep across resistance 130, this arm being connected by means of conductor 132 and conductors 125 and 126 to arm 21 and the mid point of the relay coils, respectively. Arm 131 is mounted on shaft 75 to rotate therewith and in such a sense that a relay unbalance caused by movement of arm 21 will be reduced and eventually removed by the movement of arm 131. It will be seen that resistances 118, 130 and the relay coils are all connected in parallel to a source of power. Should arm 21 move to the right it will be apparent that the coil 106 will be more highly energized than coil 107 and should this arm be moved to the left the reverse will be true. This potentiometer is a control potentiometer for a relay 105, potentiometer 130 being a balancing potentiometer. In other words, if arm 21 has been moved to the left, thereby energizing coil 107 more highly than coil 106, movement of arm 131 to the right will have the opposite effect on said coils and after it has been moved to the right far enough it will balance the effect of potentiometer 118 and the energization of coils 106 and 107 will be equal. It is therefore seen that movement of arm 21 to the left or the right will cause movement of armature 108 to the right or left, respectively, and effect a corresponding movement of switch arm 109. Resistances 120 and 123 are protective resistances and serve to prevent a short circuit across the transformer 81 should the potentiometer arms be in their opposite extreme positions. Switches 84 and 85 serve to break the circuit to the motor upon sufficient rotation thereof in either direction, caused by movement of arm 21 to either extreme end of potentiometer 118, in which case the insulated arm 90 causes the switch controlling the motor circuit to open.

A second motor 140 similar to motor 70 is provided for operating crank member 55. This motor includes windings 141 and 142, condenser 143 and armature 144. Windings 141 and 142 are connected together at one end and the junction of these windings is connected permanently to one side of the low tension secondary 154 of a transformer 155. This transformer includes a high tension primary 156 connected to line wires 100 and 101. Condenser 143 is connected between the opposite ends of windings 141 and 142 and these windings are also connected to switches 145 and 146 respectively. It will be apparent that the direction of rotation of armature 144 is determined upon whether condenser 143 is in series with winding 141 or 142 in the same manner as described in connection with motor 70.

Switch 145 is composed of contact members 147 and 153 and switch 146 is composed of contact members 148 and 149. An insulated arm 150 is arranged to be constantly driven by armature 144, this member being mounted on a shaft 151 connected through reduction gearing 152 to the armature 144. Crank member 55 is also mounted on shaft 151 for rotation therewith. It will be apparent that rotation of insulated arm 150 a sufficient distance in either direction will cause either switch 145 or 146 to be opened.

For controlling the direction of rotation of armature 145 a balanced relay 160 comprising opposed coils 161 and 162, armature 163 connected to a switch arm 164 and fixed cooperating contacts 165 and 166, is provided. It will be seen that this relay is similar to relay 105 previously described. These relay coils are connected together at one end, coil 162 being connected through conductors 167 and 168 to one side of the secondary 154 of a transformer 155. The primary 156 of said transformer is connected to lines 100 and 101. Coil 161 is connected through conductors 169 and 170 to the other side of transformer secondary 154.

A thermostat 175 is located in the space being heated and this thermostat comprises bimetallic element 176 to which is connected an arm 177 for movement thereby. Cooperating with arm 177 are fixed contacts 178 and 179, blade 177 being arranged to engage contact 178 when the temperature in the space drops to a certain value and to engage contact 179 when the temperature rises to a certain value. Contact 178 is connected through conductor 180 to the outer end of coil 161 and contact 179 is connected through conductor 181 to the outer end of coil 162. Connected in parallel with coils 161 and 162 is a potentiometer resistance 185 connected to said coils through resistances 186 and 187 and conductors 188 and 189, as shown. An arm 190 mounted on shaft 151 for rotation therewith, is arranged to sweep across resistance 185, this arm being connected to the junction of coils 161 and 162 by means of conductors 191 and 192. The bimetallic element 176 of thermostat 175 is also connected to the junction of coils 161 and 162 through conductors 193 and 192. Resistances 186 and 187 are for the purpose of preventing a short circuit across the transformer 146 regardless of the position of arms 177 and 190. It will be apparent that when the blade 177 of thermostat 175 is in engagement with contact 178, that relay coil 162 is connected directly across the transformer secondary 145 whereas coil 161 is connected thereto through resistance 185 whereby the coil 162 is more highly energized than coil 161. The reverse of this will of course be true when the thermostat blade 177 is in engagement with contact 179. If the thermostat blade 177 is in the mid position as shown and arm 190 is moved to the right, for example, it will be clear that coil 161 will be more highly energized than coil 162 and if arm 190 is moved to the left, then coil 162 will be more highly energized than coil 161. Armature 163 is moved in the direction of the more highly energized coil and will cause a similar movement of the switch arm 164 whereupon this switch arm will engage either contacts 165 or 166 depending upon which relay coil is more highly energized. When the coils are equally energized, armature 163 is in mid position, as illustrated.

With the parts in the position illustrated, valve element 50 is in mid position, in which position the amount of gas flowing to the burner 10 is approximately half that permitted when the valve is in wide open position. The room thermostat 175 is satisfied, that is, it is neither calling for more nor less heat. The gas meter is causing rotation of gear 16 and movement of rack 17 to the left and causing arm 21 to sweep across resistance 118. Contacts 38—39 and 91—92 are open so that magnet 22 and motor 70 are both deenergized. Likewise motor 140 is deenergized since the thermostat blade 177 is neither in engagement with contact 178 or 179 and potentiometer arm 190 is in mid position as shown.

Motor 30 is being constantly rotated, field 32 being energized through conductors 200 and 201 connecting said coil to the transformer secondary 42. Accordingly, cams 33 and 34 are constantly rotating and at the end of a predetermined time from the time at which they last engaged their respective contacts, members 36 and 37 will again engage these contacts. This period between which the contacts are closed is not critical but may be, for example, one hour, although a longer or lesser time would not seriously affect the operation of the system. At the end of an hour, contacts 91 and 92 will be bridged by means of member 37 on cam 34. Gear 16 is causing movement of rack 17 to the left in accordance with the amount of gas passing through the meter 15.

It should be noted that, since arm 131 is in mid position, arm 21 must have been in mid position at the end of the last period, or at the time motor 70 was last operated since arm 131 is always moved to a position at the end of each period, in which it balances the effect of potentiometer 118 on the relay 105. The fact that arm 21, as illustrated, has returned to its mid position during the next period before the end of the period, indicates that the amount of gas being consumed per unit time has increased, this increase coming about because of a call for more heat by thermostat 175, which causes an increase in the flow of gas to the burner 10 by causing valve 12 to be more widely opened. This call for more heat may come about for example, by reason of a drop in outdoor temperature, or by reason of a window or door being opened, admitting cold air from outdoors.

When the thermostat thus calls for more heat, blade 177 engages contact 178 by reason of the effect of the lowered temperature on bimetallic element 176. As previously pointed out, movement of arm 177 into engagement with contact 178 causes relay coil 162 to become more highly energized than coil 161 whereupon switch arm 164 is moved by said armature into engagement with contact 166. Current now flows through the motor 140 as follows: from the secondary 154 of the transformer 155 through conductors 170, 230, switch arm 164, contact 166, conductor 231, switch elements 153 and 147, conductor 232 through the field winding 141 through conductors 233 and 168 to the other side of secondary 154. Current also flows through winding 142 as follows: from secondary 154 through conductors 170, 230, switch arm 164, contact 166, conductor 231, switch elements 153 and 147, conductors 232, 235, condenser 143, conductors 236, 237 through field winding 142 and conductors 233 and 168 to the other side of secondary 154. Armature 144 now commences to rotate in the direction of the arrow causing crank member 55 to rotate in the direction of the arrow thereby moving lever 53 upwardly about pivot 58 which is now serving as a fulcrum. Valve 50 is accordingly moved upwardly and permits an additional amount of gas to flow through pipe 11. Crank 55 will continue to be rotated by armature 144 until the insulated arm 150 causes switch elements 153 and 147 to open. Crank pin 158 has moved through 90° from the position shown and pivots 58, 59, and 60 are so arranged that the upward movement of valve element 50 from its last position as determined by the position of crank 54 will be limited to a fixed amount, say about 10%. In other words, if the valve element 50 was formerly about 50% wide open, the movement of crank member 55 will cause said valve to be moved to about 60% open.

Rotation of shaft 151 by the motor 140 causes the arm 190 to be moved to the right.

When the temperature of the room has risen to a point wherein the thermostat arm 177 moves out of engagement with contact 178 by reason of the increased fuel supply, coil 161 becomes more highly energized than coil 162 by reason of the position of arm 190 to the extreme right of resistance 185. This causes armature 163 to move to the left which in turn moves switch arm 164 into engagement with contact 165 and establishes a circuit through the motor as follows: from the transformer secondary 154 through conductors 170, 230, switch arm 164, contact 165, conductor 245, switch elements 148, 149, conductors 240, 236, condenser 143, conductor 235, field winding 141, and conductors 233 and 168 to the other side of secondary 154. Current also flows through winding 142 as follows: from the secondary 154 through conductors 170, 230, switch arm 164, contact 165, conductor 245, switch elements 148, 149, conductors 240, 237, field winding 142, and conductors 233 and 168 to the other side of secondary 154. The motor armature 144 now starts to rotate in a counter-clockwise direction thereby moving crank 55 in the same direction and causing said valve to move back to its previous position. The motor continues operation until arm 190, which is being moved thereby, moves back to mid position, as illustrated, whereupon the current through coils 161 and 162 is again balanced and armature 163 moves back to its former position thereby moving switch arm 164 to mid position and deenergizing the motor 140.

Because of the fact that additional fuel is being required during this period to maintain the desired temperature in the space being heated, the amount of gas passing through meter 15 is greater than during the previous hour, and arm 21 moves further to the left than during the preceding hour.

Relay coil 107 becomes more highly energized than coil 106 and armature 108 is moved to the right, thereby causing switch blade 109 to engage contact 111. Motor 70 is now energized through the following circuits: from the low tension secondary 80 of transformer 81, through conductors 113, 210, contacts 91, 92, conductor 211, switch blade 109, contact 111, conductor 212, contact elements 86 and 87 of switch 84, conductors 251, 215, condenser 74, conductors 214, 217, coil 73, and conductor 216 to the other side of secondary 80. Current also flows through field winding 72 through the following circuit: from secondary 80 of transformer 81, through conductors 113, 210, contacts 91 and 92, conductor 211, switch arm 109, contact 111, conductor 212, switch elements 86, 87, conductor 251 through the field winding 72 and conductor 216 to the other side of secondary 80. Armature 71 accordingly rotates in the direction of the arrow and causes rotation of crank member 54 in the direction of the arrow. This in turn causes link 53 to pivot upwardly about the fulcrum 59 which is now stationary, thereby causing valve 50 to be more widely opened and thereby causing an increase in the flow of gas to burner 10. Rotation of armature 71 causes movement of potentiometer arm 131 to the right and when this has moved to the right a sufficient distance, it will balance the effect of potentiometer 118, as previously pointed out, and the current through coils 106 and 107 will become equal whereupon armature 108 is moved back to the position illustrated thereby breaking the circuit through the motor. The parts are so proportioned that the valve will be moved to a position permitting a flow of fuel through the pipe 11 which is equal to the average flow during the preceding period which has been taken as one hour.

Very shortly after the motor 70 has been operated as described, cam 33 moves around to a position in which element 36 thereon bridges contacts 38 and 39 and the element 37 on cam 34 moves out of bridging relation with contacts 91 and 92. Electromagnet 22 is now energized through the following circuit: from the transformer secondary 42 of transformer 40 through conductor 220, contacts 38 and 39, conductor 221, electromagnet 22, and conductors 222 and 200 to the other side of secondary 42. Energization of electromagnet 22 causes rack 17 to move upwardly whereupon its teeth are disengaged from the gear 16 and spring 23 causes said rack 17 and potentiometer arm 21 to move to the right. As soon as cam 33 has rotated to a position in which contacts 38 and 39 are no longer bridged by element 36, magnet 22 will be deenergized and rack 17 will fall into engagement with gear 16 and will again begin to move to the left. If, during the next hour, valve 50 remains in the position to which it has been adjusted, the amount of gas passing through meter 15 will be the same as during the preceding hour and arm 21 will be moved to exactly the same position that it was previously and since in this position motor 70 had rotated to a position in which the effect of potentiometer 118 on the relay coils 106 and 107 was neutralized by the position of arm 131 on resistance 130, the next time that contacts 91 and 92 are closed the motor will not rotate since coils 106 and 107 are equally energized and armature 108 remains in the position illustrated and no current flows to the motor.

During the next hour, varying conditions may cause thermostat 177 to operate the motor several times during that period. Thus, if the outside temperature has dropped considerably and the amount of gas being supplied by the valve is not sufficient, the thermostat will call for heat during a considerable portion of the time, during which time valve 15 has been opened more widely and a greater amount of gas is consumed during this period. Therefore, when the contacts 91 and 92 are closed at the end of this period by the cam 34, arm 21 will have been moved further toward the left than it was during the last hour, indicating that a greater amount of gas has been consumed. This will cause operation of motor 70 through the circuits previously described until potentiometer 118 has again been balanced by the further movement toward the right of potentiometer arm 131 in which position the valve has been opened further by crank 54, pivot 58 having been moved upwardly. The amount of gas now permitted to flow through the pipe 11 by the valve will be equal to the average flow during the last hour.

Assume now that the outdoor temperature rises so that the supply of gas through valve 12 is greater than that necessary to maintain the desired room temperature. Thermostat blade 177 will be moved into engagement with contact 179 when the temperature of the room rises to a high enough value whereupon coil 161 of relay 160 will become more highly energized than coil 162. Armature 144 of motor 140 is caused to rotate in a counterclockwise direction, the circuit through the motor being the same as that last described for said motor. This will cause crank 55 to rotate in a counterclockwise direction from the position shown through 90°, and will cause arm 150 to break the circuit through the motor after it has moved through 90° by opening switch elements 148 and 149. This movement of the valve will cause it to be moved from the previous position which may be taken as 55% maximum opening to about 45% maximum opening. It should be understood, of course, that the amount of movement that may be applied to the valve by crank 55 is not critical and may easily be varied by varying the throw of crank 55, or the relative distances of pivots 58 and 59 from pivot 60.

Assuming now that at the end of an hour the amount of gas consumed has been less than the preceding hour, arm 21 of potentiometer 18 will not have moved as far to the left as in the preceding period so that potentiometer arm 131 is too far to the right to just balance the potentiometer 118. Relay coil 106 will now be more highly energized than coil 107 and armature 108 will be moved toward the left, moving with it switch arm 109 into engagement with contact 110. Current now flows to the motor 70 through the following circuit: from the secondary 80 of transformer 81 through conductors 113, 210, switch elements 91, 92, conductor 211, switch arm 109, contact 110, conductor 250, switch elements 88 and 89, conductors 213, 217, field winding 73, and conductor 216 to the other side of transformer secondary 80. Current also flows from the secondary 80 through conductors 113, 210, contacts 91, 92, conductor 211, switch arm 109, contact 110, conductor 250, switch elements 88 and 89, conductors 213, 214, condenser 74, conductor 215, field winding 72 and through conductor 216 to the other side of secondary 80. Armature 71 will now be caused to rotate in the direction opposite that indicated by the arrow causing crank member 54 to move in the same direction until arm 131 is moved far enough toward the left to balance the effect of potentiometer 118 on coils 106 and 107. Valve member 50 will now be set so that the flow of gas will be equal to the average flow during the preceding period.

Valve member 50 has its bore somewhat smaller than the bore through the valve body and is so arranged that when crank 54 has been moved to a position in which it causes valve 50 to move to permit maximum flow of gas to pipe 11 that it can still be moved upwardly through a small distance without reducing this maximum flow. When the valve is in its wide open position by crank 54, the lower portion of the bore through the valve element is in alignment with the lower portion of the bore through the valve body, and a further slight upward movement of the valve element by crank 55 will not affect the amount of fuel passing through the valve. This is necessary since should it so happen that with the gas flow at 100% maximum, if the outside temperature should be so cold that the amount of gas is still insufficient to maintain the proper room temperature, crank member 55 will be actuated under the influence of the room thermostat 175 to attempt to open the valve still further and this additional movement may be imparted to the valve without affecting the amount of gas passing through or in any way harming the valve.

It will therefore be seen that with my system there is always a flow of gas to the burner 10 during the heating season and this flow of gas is varied at the beginning of each hour in accordance with the amount of gas which was consumed the previous hour so that if the heat demand of the space being heated during the following hour is about the same as the average heat demand of the preceding hour, there will be just the right amount of gas always flowing to the burner 10. By reason of having a constant flow of gas to the burner 10, the amount of fluctuation of the room temperature is greatly decreased, the time lag between a call for heat in a space and the arrival of additional heat in the space is greatly decreased and the danger of "overshooting," or the temperature rising above a desired value is also greatly decreased.

It will be understood, of course, that the length of time between each operation of motor 70 may be set at any desired time and that the period of one hour which has been mentioned throughout the specification is purely arbitrary.

While I have described the preferred embodiment of my invention it will be obvious to those skilled in the art that it is capable of many variations and it should be understood that my invention is limited only by the scope of the appended claims.

I claim as my invention:

1. In a conditioning system, a conditioning device for conditioning a space, means for supplying a condition changing medium to said device at varying rates in accordance with the demands of said space for a predetermined interval, and means whereby the condition changing medium is subsequently supplied at a constant rate which is equal to the average rate during said predetermined interval as long as the demand of the space is equal to the average demand during said interval.

2. In a condition controlling system, a conditioning device for conditioning a space, means for conducting a conditioning medium to said device, means for measuring the total amount of said medium required to maintain a certain condition in said space for a predetermined period of time, and means whereby the same amount of said medium may be supplied to said device at a constant rate during a like period of time.

3. In a condition controlling system, a conditioning device for conditioning a space, means for conducting a conditioning medium to said device, means for measuring the total amount of said medium required to maintain a certain condition in said space for a predetermined period of time, and means whereby the conditioning medium may be subsequently supplied at a constant rate which is equal to the average rate during said predetermined period of time.

4. In a condition controlling system, a conditioning device for conditioning a space, means for conducting a conditioning medium to said device, means for measuring the total amount of said medium required to maintain a certain condition in said space for a predetermined period of time, and means whereby the conditioning medium is subsequently supplied at a constant rate which is equal to the average rate during said predetermined period of time as long as the demand of the space is equal to the average demand during said interval.

5. In a temperature controlling system, a temperature changing device for controlling the temperature of a space, means for conducting a temperature changing medium to said device, means for controlling the amount of medium supplied so as to maintain a substantially constant temperature in said space, means for determining the total amount of said medium required to maintain said constant temperature for a predetermined period, and means controlled by said last named means for subsequently causing said controlling means to supply the proper amount at a uniform rate as long as the demand in the space is the same as the average demand during said period.

6. In a condition controlling system, a conditioning device for conditioning a space, means for conducting a condition changing medium to said device, a valve for controlling the amount of said medium supplied, a first valve operating means, a second valve operating means, a device responsive to the condition being controlled controlling said second valve operating means, means connecting said valve and said second valve operating means whereby the valve can be adjusted a predetermined amount only from the position of the valve maintained by said first valve operating means, and means for periodically operating said first valve operating means to cause said valve to move to a position whereby the rate of supply of the condition changing medium is equal to the average rate of supply during the preceding period.

7. In a condition controlling system, a conditioning device for conditioning a space, means for conducting a condition changing medium to said device, a valve for controlling the amount of said medium supplied, a first valve operating means, a second valve operating means, a device responsive to the condition being controlled controlling said second valve operating means, means connecting said valve and said second valve operating means whereby the valve can be adjusted a predetermined amount only from the position of the valve maintained by said first valve operating means, means for measuring the amount of the condition changing medium that is supplied during a predetermined period, and means controlled by said measuring means for causing said first valve operating means to move said valve to a position wherein the rate of supply of said condition changing medium is equal to the average rate of supply during said predetermined period.

8. In a condition controlling system, a conditioning device for conditioning a space, means for conducting a condition changing medium to said device, valve means controlling the flow of said medium, a metering device through which the condition changing medium flows, a condition responsive device in the space to be conditioned, a main valve operating means, a secondary valve operating means under the control of said condition responsive device, means connecting said valve means and said secondary valve operating means whereby the valve means may be adjusted thereby a predetermined amount only from the position of the valve means maintained by said main valve operating means, means connecting said main valve controlling means and said metering device whereby said main valve operating means periodically changes the position of said valve means in accordance with the amount of condition changing medium used during the preceding period as determined by the metering device.

9. In a conditioning system, a conditioning device for conditioning a space, means for conducting a conditioning medium to said device, valve means for controlling the amount of said medium supplied, means for periodically adjusting said valve means so that the rate of supply of said medium is equal to the average rate during the preceding period, and means whereby the valve means is adjusted during any period to permit the flow at a greater or lesser rate should the demand for said medium increase or decrease during said period.

10. In a conditioning system, a conditioning device for conditioning a space, means for conducting a conditioning medium to said device, valve means for controlling the amount of said medium supplied, means for periodically adjusting said valve means so that the rate of supply of said medium is equal to the average rate during the preceding period, condition responsive means in the space to be conditioned, and means under the control of said condition responsive means for causing adjustment of said valve means at any time during any period in response to a demand for change in the rate of supply of said medium by said condition responsive means.

11. In a conditioning system, a conditioning device for conditioning a space, means for conducting a conditioning medium to said device, valve means for controlling the amount of said medium supplied, means for periodically adjusting said valve means so that the rate of supply of said medium is equal to the average rate during the preceding period, condition responsive means in the space to be conditioned, means under the control of said condition responsive means for causing adjustment of said valve means at any time during any period in response to a demand for change in the rate of supply of said medium by said condition responsive means, and means for limiting the extent of adjustment of said valve means during any period from the normal position of said valve for said period.

12. In a condition controlling system, a conditioning device for conditioning a space, means for conducting a condition changing medium to said device, condition responsive means in said space, means under the control of said condition responsive means for varying the rate of supply of said medium in accordance with changing demands in said space, and means for periodically changing the limits between which the rate of supply may be varied by the condition responsive means, in accordance with the total amount of said medium supplied during the preceding period.

13. In a condition controlling system, a condition responsive means in a space whose condition is to be controlled, a conditioning device for said space, controlling means under the control of said condition responsive means for controlling the amount of a conditioning medium supplied to said device, a metering device operated by the flow of medium to the conditioning device and measuring the amount of medium being supplied thereto, and means operated by said metering device for adjusting the controlling means at the end of a predetermined period whereby the conditioning medium is supplied at a rate which is equal to the average rate of supply during said period.

14. In a condition controlling system, a condition responsive means in a space whose condition is to be controlled, a conditioning device for said space, controlling means under the control of said condition responsive means for controlling the amount of a conditioning medium supplied to said device, a metering device, means operated by said metering device for adjusting the controlling means at the end of a predetermined period whereby the conditioning medium is supplied at a rate which is equal to the average rate of supply during said period, and means whereby the controlling means is operated a limited amount only by the condition responsive means should the rate of flow be improper to maintain the desired condition during the next period.

15. In a conditioning system, a conditioning device for conditioning a space, means for conducting a conditioning medium to said device, controlling means whereby the amount of medium which may be conducted is varied in accordance with varying demands in said space, means providing limits between which said controlling means may operate, and means for changing the limits at the end of each period in accordance with the amount of medium conducted in the preceding period.

16. In a conditioning system, a conditioning device for conditioning a space, means for conducting a conditioning medium to said device, controlling means whereby the amount of medium which may be conducted is varied in accordance with varying demands in said space, means providing limits between which said controlling means may operate, and means for adjusting the limits at the end of each period so that the limits are a predetermined amount above and below the average rate of conduction of the medium in the preceding period.

17. In a control system, a controller, means variably positioning said controller in accordance with a variable condition, a controlled device, means causing said controlled device to move to a position corresponding to the position of said controller, means periodically interrupting the control of the controller over the controlled device, and means after each of said interruptions for causing said controller to move to a starting position prior to subsequent movement of the controller to a position depending upon the variable condition.

18. In a control system, an electrical controller, means moving said controller from an initial position to a final position determined by a variable condition, a controlled device, circuit means causing said controlled device to move to a position corresponding to the position of said controller after the controller has moved from its initial position to its final position, and means for causing movement of said controller back to its initial position after said controlled device has moved to the above named position prior to subsequent movement of said controller to a final position as determined by the variable condition.

19. In a control system, an electrical controller, means causing movement of said controller from an initial position to a final position determined by a variable condition, an electrically controlled device, circuit means connecting said controller and said controlled device for causing said controlled device to move to a position corresponding to said final position of said controller, switch means in control of said circuit means, means operating said switch means to close said circuit means after said controller has moved to its final position, and means for causing movement of said controller back to its initial position after said controlled device has moved to the above named position prior to subsequent movement of said controller to a final position as determined by the variable condition.

20. In a conditioning system, a conditioning device for conditioning a space, means for supplying a condition changing medium to said device at varying rates in accordance with the demands of said space for one predetermined interval, and means for adjusting the supplying means at the end of said interval so that if the adjustment of the supplying means remains the same during a succeeding like interval the same amount of condition changing medium will be supplied during the succeeding interval as was supplied during the said one interval.

21. In a conditioning system, a method of control comprising supplying a medium having a character such that the amount of conditioning varies with the supply of medium, controlling the supply of said medium to maintain a given condition, measuring the amount of medium supplied during a given period of time while the condition was maintained substantially constant to determine the required rate of medium supply to maintain the given condition and adjusting the rate of medium supply in accordance with the rate so determined.

HENRY E. HARTIG.